May 8, 1934.  A. F. ECCHER  1,957,994
TREE COVERER FOR SILKWORM CULTURE
Filed Jan. 9, 1933  4 Sheets-Sheet 1
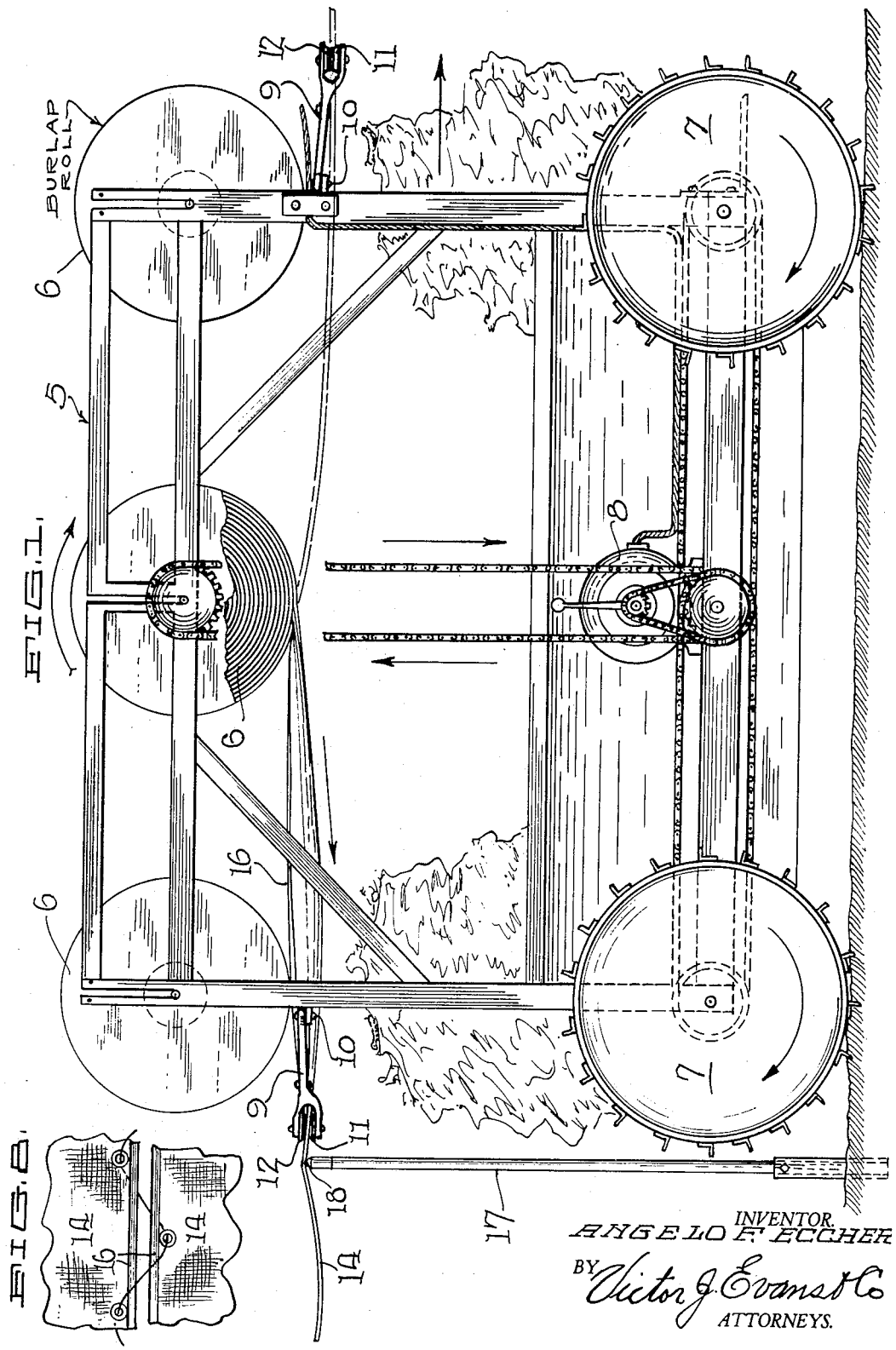

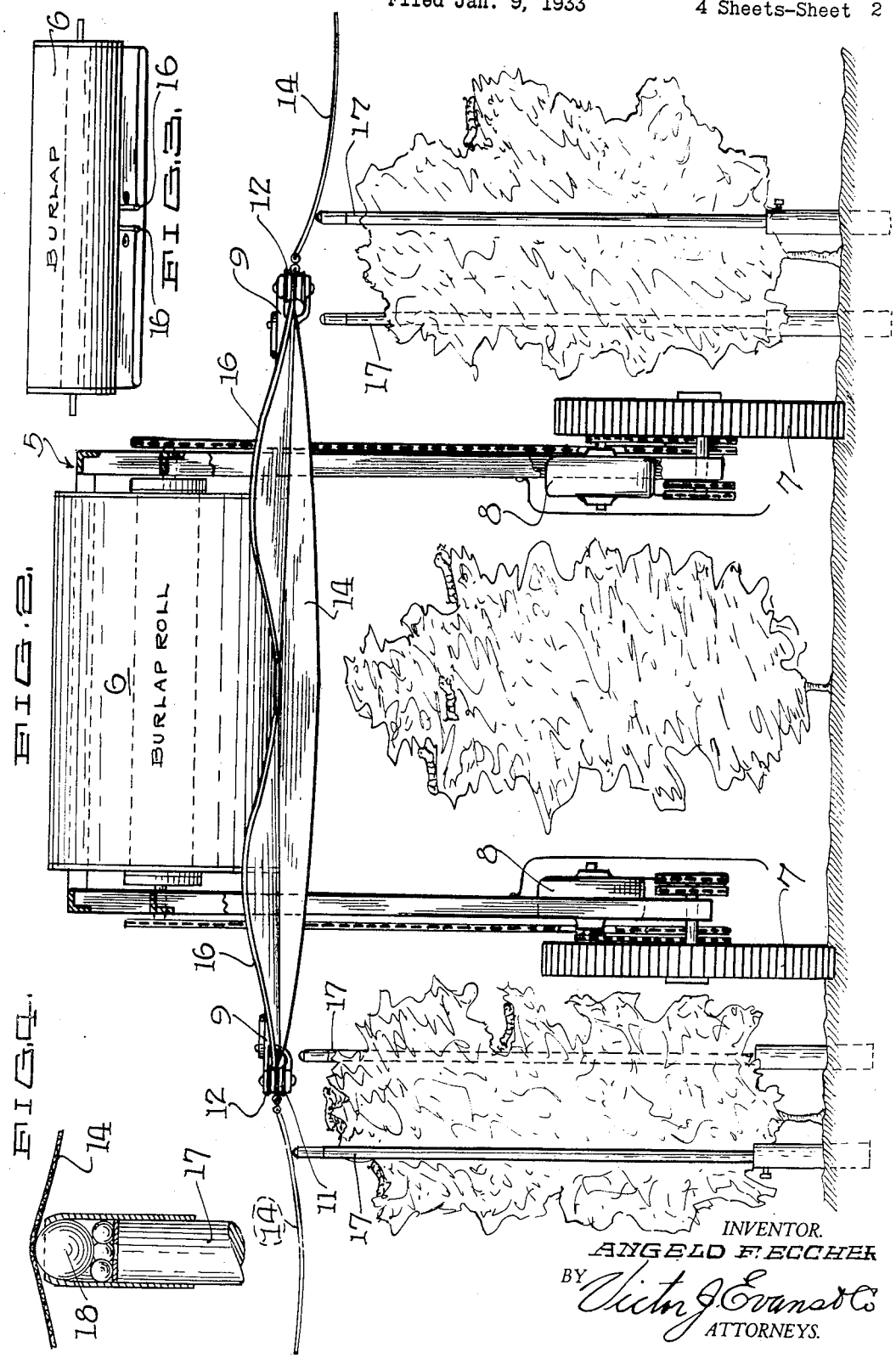

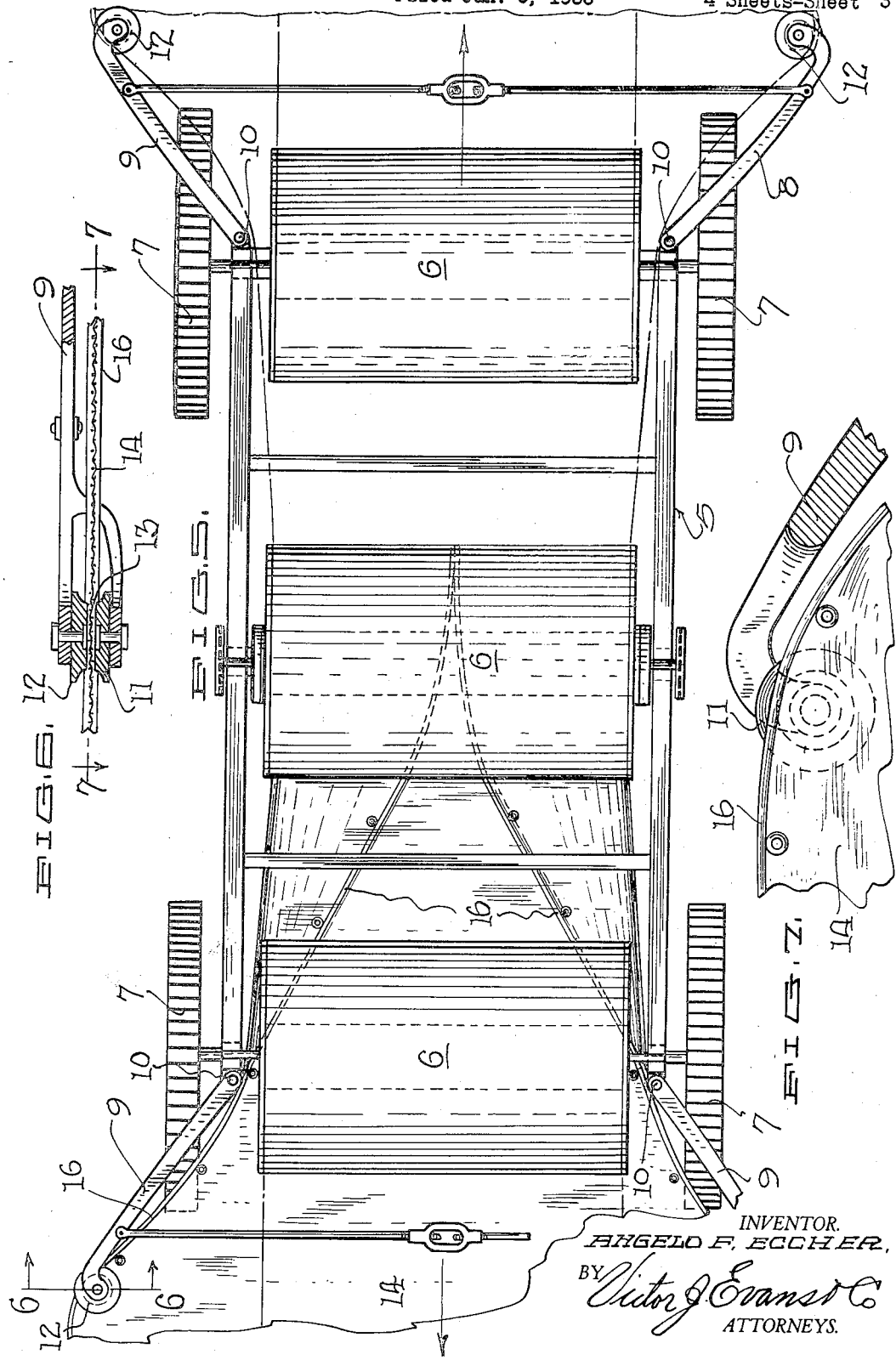

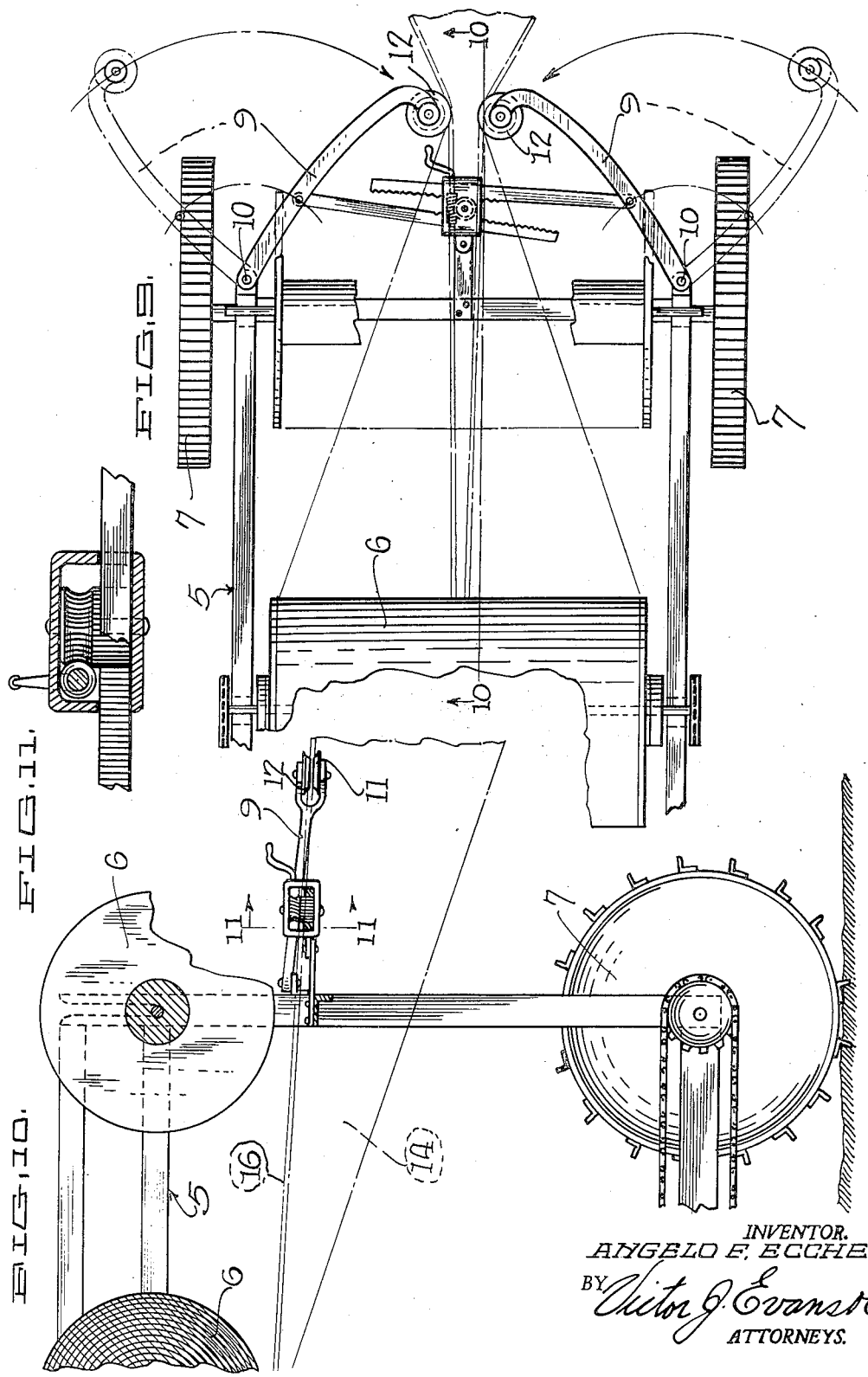

Patented May 8, 1934

1,957,994

UNITED STATES PATENT OFFICE 1,957,994

TREE COVERER FOR SILKWORM CULTURE

Angelo F. Eccher, San Francisco, Calif.

Application January 9, 1933, Serial No. 650,932

10 Claims. (Cl. 47—20)

This invention relates to improvements in silk culture and has particular reference to a mechanism for spreading covers above the vegetation upon which the silkworms feed.

The principal object of the invention is to provide effective means for covering trees so that the silk worms will be protected against climatic conditions, birds and other pests, which might destroy the feeding worms.

A further object is to produce a device which is easy to handle.

A still further object is to produce a device which will minimize the amount of labor incident to silkworm culture.

Other objects and advantages will be apparent during the course of the following description.

In the accompanying drawings forming a part of this specification and in which like numerals are employed to designate like parts throughout the same, Fig. 1 is a side elevation of my device, Fig. 2 is an end elevation of Fig. 1, Fig. 3 is one of the rolls of burlap removed from the machine and on a reduced scale, Fig. 4 is a fragmentary side view partly in cross section, showing the anti-friction burlap support, Fig. 5 is a top plan view of Fig. 1, Fig. 6 is a fragmentary detail view partly in cross section of one of the spreader guide arms, taken on the line 6—6 of Fig. 5, Fig. 7 is a top plan view of Fig. 6 taken on the line 7—7 of Fig. 6, Fig. 8 is a fragmentary detail view showing the manner in which the adjacent burlap strips are held together, Fig. 9 is a fragmentary detail view showing a modified form of guide arm actuating mechanism, Fig. 10 is a side elevation of Fig. 9 taken on the line 10—10 of Fig. 9, and Fig. 11 is a fragmentary detail view on the line 11—11 of Fig. 10 and looking in the direction of the arrows.

In the raising of silkworms for silk production, great care must be given the worms during certain stages of their existence. Rainfall, heavy dew, certain light conditions and birds, are likely to destroy the worm, and thus ruin the profits which might otherwise be realized. It is also essential to provide means for collecting the cocoons in a simple manner after the same have been formed. I, therefore, employ a burlap covering for a field in which the worms are being propagated, and by covering the entire field with burlap and at the proper time lowering the burlap into contact upon the mulberry trees on which the worms are feeding, it will be apparent that the worms will climb the trees, move onto the burlap and form their cocoons, which cocoons may be readily gathered when they are in proper condition. It is essential that the cocoons be gathered before the worms have reached the chrysalis stage and pass to the moth stage. Otherwise they would break out of the cocoon thus ruining it for commercial purposes. Of course it is necessary to permit some of the worms to complete the cycle in order that fresh eggs and fresh worms may be continually developing.

In the accompanying drawings wherein for the purpose of illustration is shown a preferred embodiment of my invention, the numeral 5 designates a substantially rectangular frame as a whole, which frame has mounted thereon any number of rolls of burlap designated by the numeral 6. These rolls may be connected to power mechanism the center roll being so designated. Supporting wheels are shown at 7 and are preferably driven by a motor mechanism 8, there being a separate motor upon each side of the frame so that the wheels upon opposite sides may be independently driven. As this driving mechanism forms no part of my invention, further reference thereto will be omitted.

Mounted upon the frame, adjacent each end thereof, is a pair of guide arms 9. As these are identical but one guide arm will be described. These guide arms are pivoted as at 10 and each carries a divided roller at its free end. Referring to Figs. 5, 6 and 7, the construction will be best seen, where it will be noted that the rollers consist of two halves 11 and 12. This provides a space 13 therebetween through which the fabric 14 of the burlap mass pass. It will be noted that a bead or thickened edge 16 is formed upon the fabric of the burlap which edge engages the two halves 11 and 12 of the guide wheel. Positioned at suitable points adjacent the trees are extensible supports 17, which may be raised or lowered in any convenient manner. Carried upon the top of these supports 17 are anti-friction devices 18 which consist of balls over which the fabric 14 of the burlap may move without chafing.

In use the device is run between rows of trees as shown in Fig. 2. We will assume now that burlap is being taken off from the roll, mounted in the center of the machine. The roll is first folded as shown in Fig. 3. The guide arms 9 are extended so that they will overlie the space between the adjacent rows of supports 17 (see Fig. 2). The means of keeping these arms extended may take the form of a turn-buckle and rod as shown in Fig. 5, or may take the form of rack bars and a gear arrangement as shown in Figs. 9, 10 and 11. The form shown in these Figures 9-10-11 is preferable for the reason that the arms may be quickly drawn inwardly for folding the burlap when it is removed, as will be later described. The burlap coming from the roll is first unfolded and the edges 16 caused to pass to the outside of the divided guide roll. This arrangement permits the fabric portion of the burlap to pass between the guide wheels (see Fig. 6). As the vehicle moves along, the material will be pulled out and spread, the edges being fastened by attendants, either to suitable supports at the beginning edge or to the next adjacent strip of burlap, as the case may be. In Fig. 8 I have shown a method of lacing the two adjacent strips of burlap. These lacings may be accomplished by a person on a stepladder and may run the entire length or may simply be lacings which are tied at each point. As soon as one roll of burlap has been used, the next roll is joined on and in this manner a whole field may be quickly covered with the burlap and without undue labor or damage to the trees. When it is desired to remove the burlap from the field, the process is reversed the difference being that the bead is engaged by the opposite sides of the wheels as illustrated in Fig. 9, the wheels being withdrawn from the position of Fig. 5 to the position of Fig. 9 during the re-reeling of the burlap. In re-reeling, the goods sags to the dotted line position 14 of Fig. 10 and an attendant proceeds just in advance of the machine and with a knife cuts the lacing between the adjacent edges of the burlap strips. The burlap is placed on and taken off during a season when the trees will not be injured, due to their lack of leaves and the fact that the worms are not yet upon the trees.

It is apparent that the details of construction here disclosed are merely sufficient to render the device operative, and that in natural practice certain modifications can be made without departing from the spirit of the invention.

I have devised the present invention for the reason that I have found that silkworms can be successfully grown in certain parts of the United States where climatic conditions are propitious, and from successful experiments my method of propagating silkworms and my method of protecting the same has acquainted me with the fact that I can compete with producers of real silk in foreign countries. The production of silkworms for the purpose of obtaining real silk, has been handicapped in the United States because it has always been considered a fact that the cheapness of the industry in foreign countries could never be equalled in the United States. Therefore, I have devised a system in which by having the mulberry trees planted close together at a distance from three to five feet, the sun can penetrate through all parts of the plant with a consequent flourishing growth of the plants. I have further ascertained that silkworms can be preserved on the plants for their entire life until they have made their cocoons. In the present invention, as hereinbefore stated, I eliminate the possibility of the burlap touching the plants with a consequent rotting of the leaves, by employing the extensible supports 17, which in practice will extend about two feet higher than the plants. However, when the time is auspicious for the silkworms to make their cocoons the burlap will be lowered on the plants in order that the silkworms will travel to the burlap and there make their cocoons. The apparatus that I propose utilizing can readily be moved in a field of mulberry plants without damaging the same.

I might also mention that the silkworms have the natural ability to climb upwards all the time and nature has equipped the silkworms with means to prevent them from entirely falling from the plant. This means is either the filament that is carried in the mouth of the silkworm or the employment of their many legs which permits them to obtain various footholds.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:—

1. In a device of the character described, a portable frame, traction means for driving said frame, fabric carrying rolls mounted on said frame, fabric mounted on said rolls, said fabric being folded on said rolls, and means carried by said frame for engaging the edges of the fabric and unfolding the fabric as the machine is moved forward.

2. In a device of the character described, a portable frame, traction means for driving said frame, rolls of fabric rotatably mounted in said frame and being foldably wound on said rolls, said fabric being provided with beaded edges, roller means carried by the frame and engaging the free beaded edges of said fabric to cause the unfolding and spreading of the same.

3. In a device of the class described, means for transporting and unfolding a roll of folded fabric having beaded edges comprising a portable frame including means for driving the same, means for driving said roll in the direction of travel of said frame, and means mounted on said frame for engaging the beaded edges of the fabric and unfolding the same as the machine progresses.

4. In a device of the class described, means for transporting and unfolding a roll of folded fabric having beaded free edges comprising a portable frame adapted to straddle rows of plants and including means for driving the same, means for simultaneously causing the rotation of said roll in the direction of travel of said frame, roller means mounted on said frame and adapted to engage the beaded edges of the fabric to cause the unfolding and spreading of the same as the machine progresses, and means for adjusting said roller means to adjust the spreading of the fabric.

5. In a device of the class described, a portable frame having a plurality of rolls of folded fabric mounted thereon, means for driving said frame and means for rotating one of said rolls to cause the unfolding of fabric therefrom, means associated with said frame and engaging the free edges of said fabric to cause the spreading of the same, and adjusting means cooperating with said spreading means to adjust the spreading function thereof.

6. In a device of the class described, a folded fabric-wound roll, means for dispensing and unfolding said fabric from said roll, and means for transporting said roll as the fabric is dispensed therefrom.

7. In a device of the class described, a roll having fabric wound thereon in folded form, means associated therewith for unfolding fabric therefrom, means for transporting said roll, and means for rotating the same to cause the unwinding therefrom of the fabric as it is dispensed from the roll.

8. In a device of the character described, a frame, rolls of folded fabric mounted on said frame, said fabric having beaded edges, guide arms carried on said frame, rollers carried on said guide arms and adapted to engage said beaded edges, whereby said fabric will be spread over an area as said frame is transported in a longitudinal direction.

9. In a device of the character described, a frame, a plurality of rolls of folded fabric mounted on said frame, said fabric having beaded edges, said edges being folded on said fabric so that said edges lie in the medial line of said fabric, guide arms carried on said frame, split rollers carried on said guide arms and adapted to engage said beads whereby said fabric is unfolded and spread so that said fabric will cover a maximum area when said frame is transported in a horizontal direction.

10. In a device of the character described, a frame, a plurality of arms mounted on said frame, split rollers mounted on said arms, a folded fabric mounted on said frame, said fabric having beaded edges, said fabric passing through said split rollers whereby said rollers engage said bead to spread said fabric for covering a predetermined area.

ANGELO F. ECCHER.